US008402687B1

(12) United States Patent
Jarrell (10) Patent No.: US 8,402,687 B1
(45) Date of Patent: Mar. 26, 2013

(54) ARTIFICIAL LURE WITH ADJUSTABLE, EXCHANGEABLE PROVISIONS

(76) Inventor: John L. Jarrell, Springfield, MO (US)

(*) Notice: Subject to any disclaimer, the term of this patent is extended or adjusted under 35 U.S.C. 154(b) by 202 days.

(21) Appl. No.: 12/806,962

(22) Filed: Aug. 25, 2010

Related U.S. Application Data

(63) Continuation-in-part of application No. 11/387,567, filed on Mar. 23, 2006, now abandoned.

(60) Provisional application No. 60/664,623, filed on Mar. 23, 2005.

(51) Int. Cl.
*A01K 85/00* (2006.01)

(52) U.S. Cl. .......................................... 43/42.28

(58) Field of Classification Search ............... 43/42.09, 43/42.25, 42.28, 42.36
See application file for complete search history.

(56) References Cited

U.S. PATENT DOCUMENTS

| 1,288,118 | A | 12/1918 | Morian | 43/42.09 |
|---|---|---|---|---|
| 1,854,696 | A | 4/1932 | Herington | 43/42.06 |
| 2,237,534 | A | 4/1941 | Van Der Clute | 43/42.05 |
| 2,254,949 | A | 9/1941 | Messacar | 43/42.05 |
| 2,387,255 | A | 10/1945 | Godlewski | 43/42.08 |
| 2,649,226 | A | 8/1953 | Lay | 222/539 |
| 2,805,511 | A | 9/1957 | Cicala | 43/42.06 |
| 2,808,677 | A | 10/1957 | Dusablon et al. | 43/42.22 |
| 3,991,504 | A | 11/1976 | Pieper | 43/42.06 |
| 4,047,317 | A | 9/1977 | Pfister | 43/42.06 |
| 4,098,017 | A | 7/1978 | Hall | 43/42.06 |
| 4,520,588 | A | 6/1985 | Hindermyer | 43/42.06 |
| 4,603,502 | A | 8/1986 | MacDonald | 43/41 |
| 4,777,757 | A | 10/1988 | de Marees can Swinderen | 43/41 |
| 4,811,513 | A | 3/1989 | Grobl | 43/17.6 |
| 4,831,768 | A | 5/1989 | Sorace | 43/42.09 |
| 4,881,340 | A | 11/1989 | Davis | 43/42.06 |
| 5,113,607 | A | 5/1992 | Pate | 43/42.28 |
| 5,167,089 | A * | 12/1992 | Schriefer | 43/42.36 |
| 5,207,016 | A * | 5/1993 | Pate | 43/42.28 |
| 5,261,181 | A | 11/1993 | Melton | 43/42.06 |
| 5,276,992 | A | 1/1994 | Kato | 43/42.06 |
| 5,369,906 | A | 12/1994 | Anterni | 43/42.09 |
| 5,598,659 | A | 2/1997 | Vanorden | 43/42.23 |
| 5,946,990 | A | 9/1999 | Bonacci | 81/176.15 |
| 5,992,083 | A | 11/1999 | Deng et al. | 43/42.15 |
| 6,357,167 | B1 | 3/2002 | Bradford | 43/42.09 |
| 2002/0007583 | A1* | 1/2002 | Nelson | 43/42.09 |
| 2002/0073607 | A1* | 6/2002 | Hickok et al. | 43/42.25 |
| 2006/0042147 | A1* | 3/2006 | Jenkins | 43/42.09 |

OTHER PUBLICATIONS

Johnny Morris's Offshore Angler Catalog. 1998, pp. 52-57.
South Florida Sport Fishing Magazine, Winter 2003/04. pp. 10 and 101.
"If It Doesn't Have a Bill—It's Just a Bait." Decker. M., *Big Game Fishing Magazine*, Mar./Apr. 2006. pp. 20-27.

* cited by examiner

*Primary Examiner* — Joseph W Sanderson
*Assistant Examiner* — Valentina Xavier
(74) *Attorney, Agent, or Firm* — Jonathan A. Bay (57) ABSTRACT

An artificial fishing lure has adjustable body parts, or in the alternative, interchangeable body parts, so that the swimming action of the lure can be altered among distinct swimming patterns by adjustments that for the most part eliminate, after the lure has been fully rigged onto fishing line with terminal tackle, the need for the angler from having to cut the line. That way, anglers can variously alter the swimming pattern of the lure among several distinct patterns without having to cut the line to do so.

7 Claims, 10 Drawing Sheets

ARTIFICIAL LURE WITH ADJUSTABLE, EXCHANGEABLE PROVISIONS

CROSS-REFERENCE TO PROVISIONAL APPLICATION(S)

This application is a continuation-in-part of U.S. patent application Ser. No. 11/387,567, filed Mar. 23, 2006 now abandoned, which claims the benefit of U.S. Provisional Application No. 60/664,623, filed Mar. 23, 2005, the disclosures of which are incorporated herein by reference.

BACKGROUND AND SUMMARY OF THE INVENTION

The invention relates to artificial fishing lures and, more particularly, to an artificial fishing lure having adjustable body parts.

It is an object of the invention to significantly alter the swimming action of the lure by adjustments that for the most part eliminate the angler from having to cut the line.

Saltwater trolling lures are typically shaped like aquatic missiles. They are generally, but not always, cylindrically symmetric. Their fore-end can be referred to as the nose of the lure. It is the contour of the nose—both when viewed straight on and from the side—which has the most significant effect on the swimming action of the lure.

That is, if two lures are compared to each other—one which has bullet-shaped nose that is one-inch (2.54 cm) diameter at the base, the other which has a concave contour that is one-inch (2.54 cm) diameter at the rim—then the following will be true. The bullet nose lure will swim through the water with much less resistance than the concave nose.

Both actions are desirable, and if not under one circumstance then under another, but often time not under the same circumstance. Therefore, more particularly, it is an object of the invention to provide a manually adjustable fishing lure, the adjustment of which significantly alters the swimming action, and without having to cut the line or else add or remove parts.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIGS. 4 through 6 comprise a series of comparable views to show one version of a cap in accordance with the invention which is reversible for different effects, wherein:

DETAILED DESCRIPTION OF THE PREFERRED EMBODIMENTS

FIGS. 1 through 3a show an artificial fishing lure 20 in accordance with the invention that is variously transformable into numerous distinguishable transformations by means of adjustable or interchangeable provisions as more particularly described below.

The preferred use environment for this lure 20 includes without limitation use as a trolling-type saltwater, "topwater" lure. By way of background, saltwater anglers troll topwater lures at speeds including without limitation eight to ten knots for tuna and the like. For other game species, saltwater anglers troll faster still (eg., fifteen knots or so). In contrast, freshwater anglers tend to troll slower than three knots. Accordingly, saltwater anglers toll at what seem to freshwater anglers as streaking speeds.

At such considerable speeds, topwater lures tend to rise to the surface regardless if the lures are heavier than water. That is, without a lip to make them dive, trolling-type saltwater "topwater" lures rise up and skip on the surface or otherwise break it intermittently. Another aspect of saltwater trolling is that, saltwater anglers very much prefer to attach or tie the leader line directly to the hook. That is, the weight classes of such leader vary anywhere from an eighty to a five-hundred pound line class (~thirty-five to ~two-hundred twenty-five kg). Again to contrast to freshwater trolling, freshwater anglers are satisfied with lures that have a line-attaching front eyelet comprising an eye screw twisted into the lure's plug body: —likewise, the hooks likely dangle off the plug body by screw attachments also. None of that will satisfy saltwater anglers with saltwater trolling lures. For maximum strength, they want the main line attached or tied directly to the leader line which in turn is attached or tied directly to the hook. Accordingly, trolling-type saltwater topwater lures typically are slid or threaded on the leader line like a bead on a necklace.

For this purpose, trolling-type saltwater topwater lures typically have an axially-elongated line-hole extending all the way through them. The diameter of such line-holes is small, just sizable enough to allow easy threading of the leader line there through. In use, the tag end of the leader line is simply slid or threaded through the line-hole of the lure. The lure can slide on the leader line in fashion of, again, a bead on a necklace.

Hence the lure is seemingly relatively free to slide up and down the leader line without restraint. And it is, when not being trolled. However, in the water and at trolling speeds, the drag of water on the lure naturally forces it hard against the line attachment to the fishhook and/or fishhook's eyelet. That is, the diameter of such line-holes are not large enough to allow the fishhook to pull through.

FIGS. 1 through 3a show a first embodiment of the artificial fishing lure 20 in accordance with the invention. It comprises an axially-elongated body 22 (this one, in the drawings, resembling a barrel shape) extending between leading and trailing "cup rim" ends 26 and 28, a cap 60 that couples with the axially-elongated body 22's leading end 26, a skirt clamp 40 that couples with the axially-elongated body 22's trailing end 28, and a skirt 30 fastened thereby.

Figure 11:
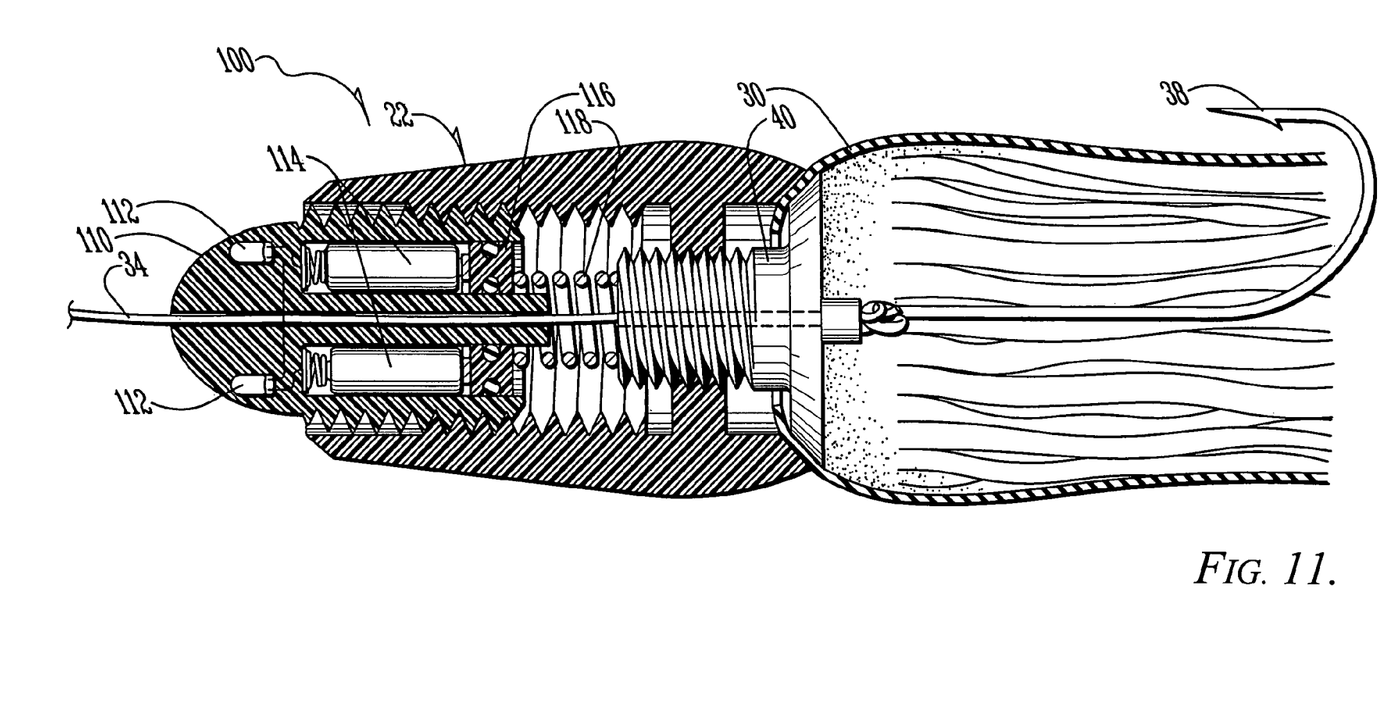
FIG. 11 is a partial sectional view comparable to FIG. 8 except showing the production of an illuminated effect in accordance with the invention.
Figure 12:
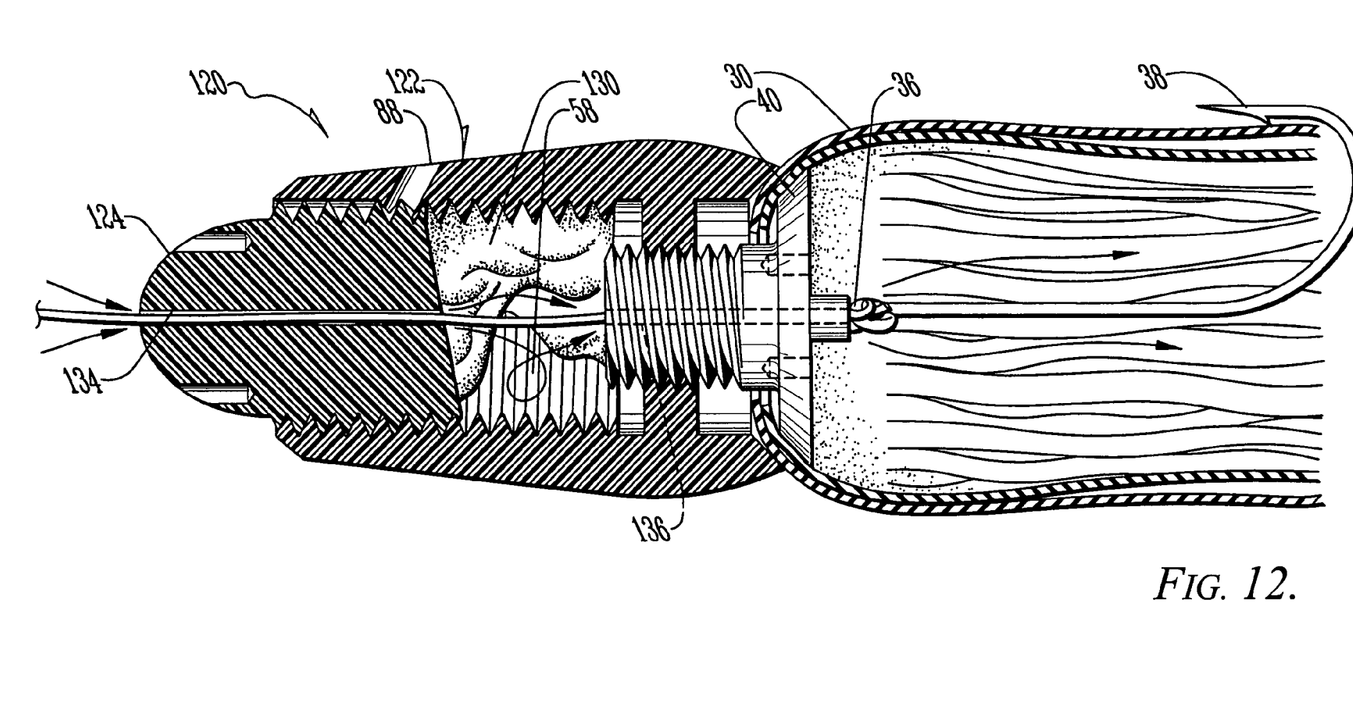
FIG. 12 is a partial sectional view comparable to FIG. 8 except showing the production of a scent-issuing effect in accordance with the invention.
Figure 13:
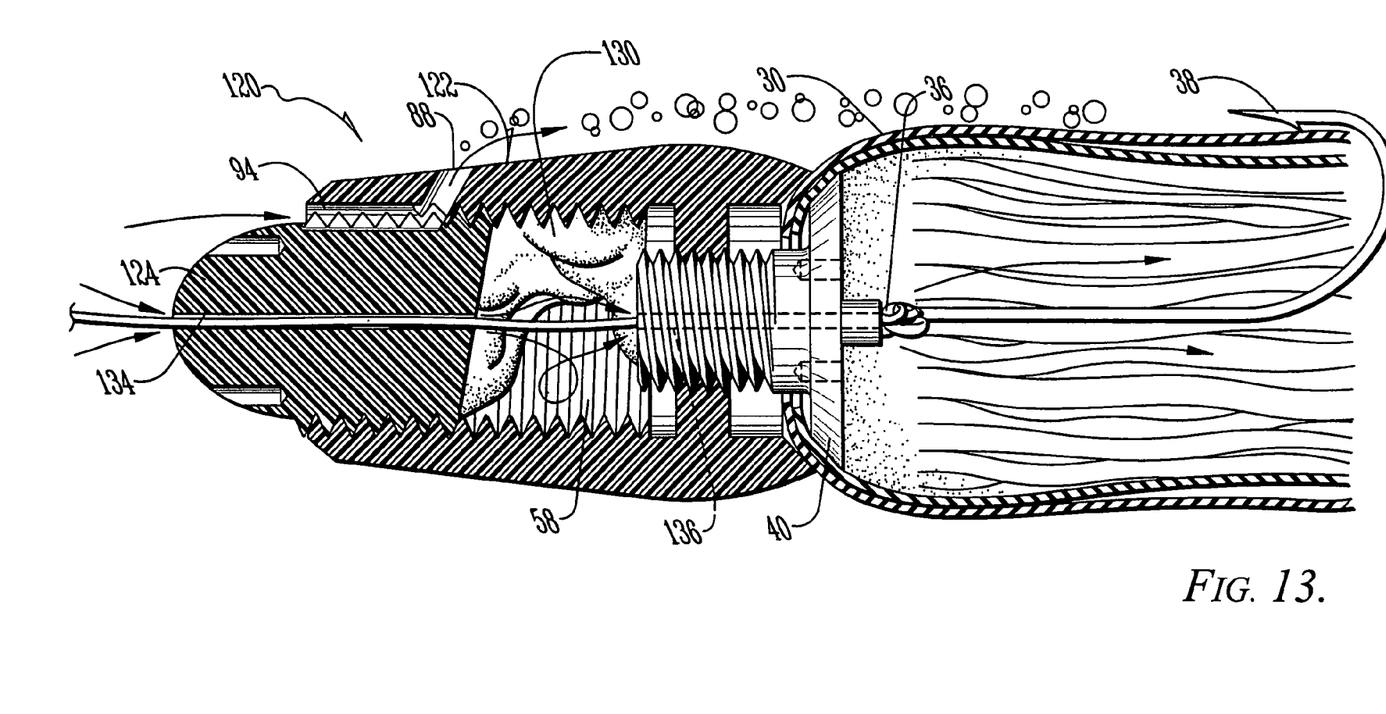
FIG. 13 is a partial sectional view comparable to both FIGS. 8 and 12 and showing the combination thereof for concurrently combining the production of the bubbling/jetting effect of FIG. 8 with the scent-issuing effect of FIG. 12.

Both the cap 60 and skirt clamp 40 have line-holes formed through them (eg., indicated by reference numerals 134 and 136 in FIGS. 12 and 13). The drawings show the line-holes 134 and 136 extending through the central axes of the front cap and skirt clamp for sake of illustrating one preferred embodiment of the invention. However, in particular reference to the front cap 60 (and given other reference numeral designations in FIGS. 7 through 13), it is alternately preferred to orient the line passage 134 off axis. For example and without limitation, it is one preference of the invention that the line-passage 134 might be centered on the convex (torpedo-nose) end but below center on the flattened (and slanted) end. In all cases, it is preferred if the line-holes 134 and 136 are sized to allow for the sliding passage of fishing line 34 through them. The fishing line 34 terminates in a tag end 36 knotted to a fishhook 38 behind the skirt clamp 40. Whereas the drawings show a knot, other attachment implementations are known in the art including without limitation devices which resemble crimp-on cable clamps (not shown) and the like.

The knotted tag end 36 (or whatever attachment implementation is utilized) and/or the fishhook 38's eye prevents the hook 38 and line 34 from pulling through the line-holes of the lure 20.

Figures 1, 2:
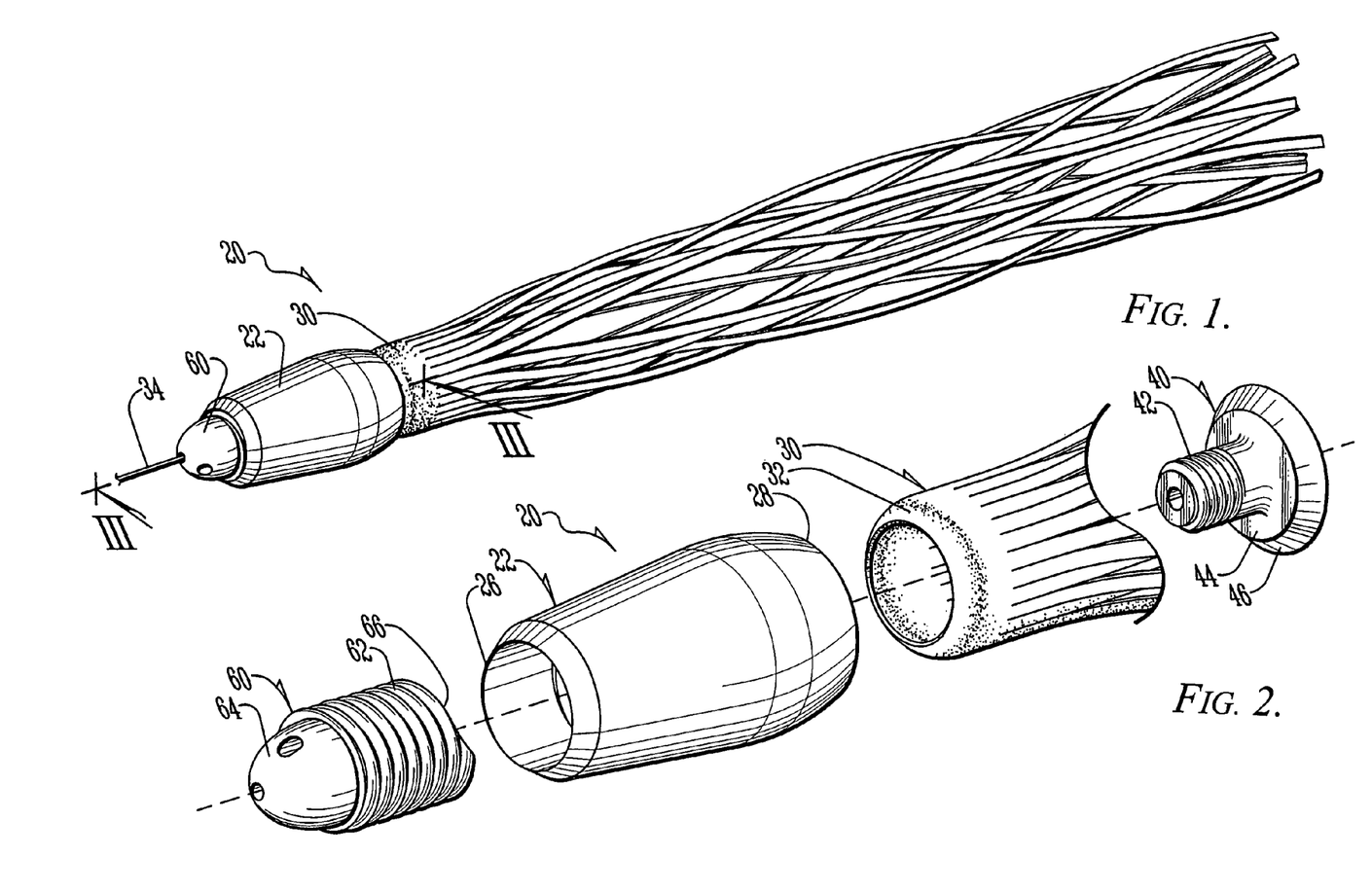
FIG. 1 is a perspective view of an artificial fishing lure in accordance with the invention and having adjustable or interchangeable provisions.
FIG. 2 is an enlarged-scale perspective view comparable to FIG. 1 except exploded and with portions broken away.
Figure 3A:
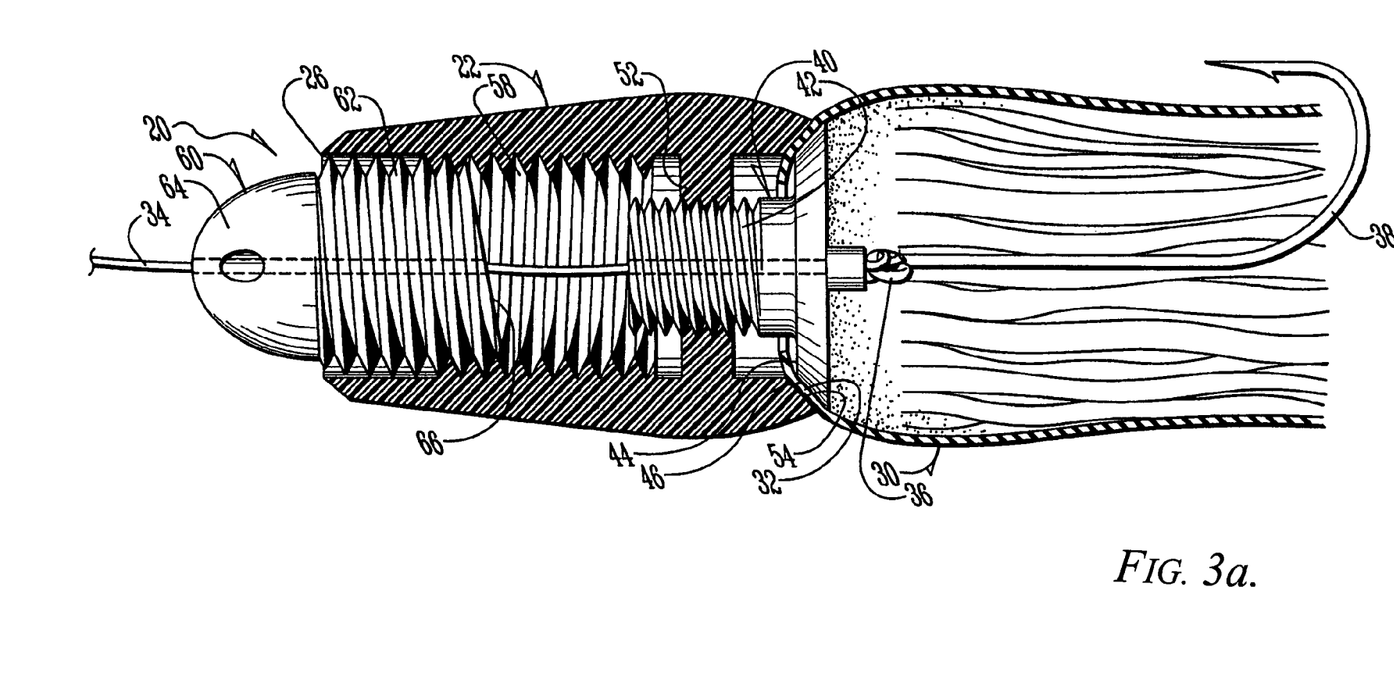
FIG. 3 is an enlarged-scale partial sectional view taken along line III-III in FIG. 1.
Figure 3B:
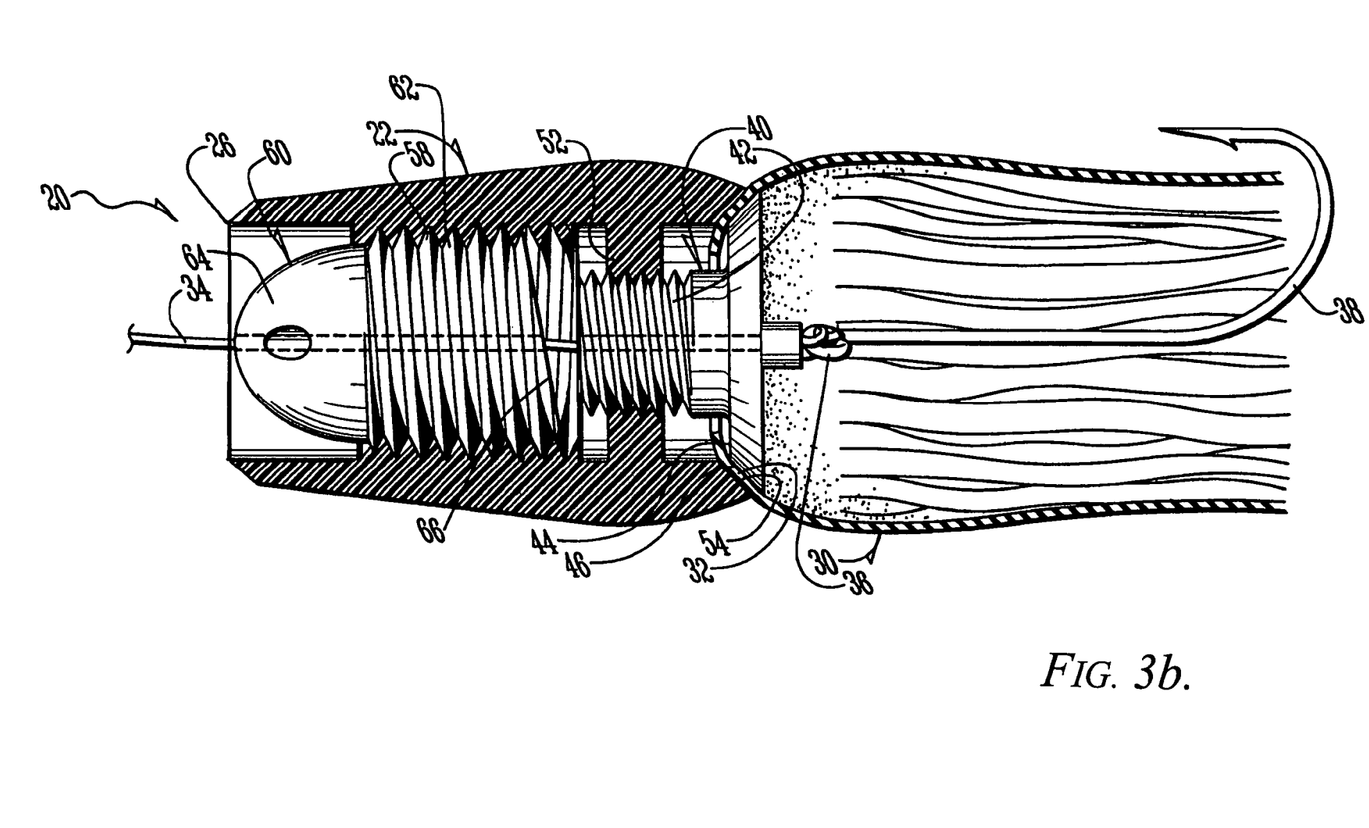

Given the foregoing, it is an aspect of the invention to provide a skirt clamp 40 as shown which can be undone from the body 22 (or just loosened) without having to cut the line. This advantage allows an angler to replace one skirt 30 for another skirt without the angler having to cut the line 34 to do so. Although only one skirt is shown in FIGS. 2, 3a and 3b (see also FIGS. 8 and 12-13 in which two skirts are shown doubled-up). In other words, the lure 20 is arranged to allow one skirt 30 to be exchanged for another skirt: —while conveniently eliminating the need to cut off the line-tied hook 38 (again, only one skirt shown in FIGS. 2-3b, but see FIGS. 8 and 12-13 which show two skirts doubled-up).

It is an additional aspect of the invention that the inventive skirt clamp 40 securely clamps the selected skirt 30 to the lure body 22 to reduce chances of the skirt 30 being tugged back or indeed even being yanked off by short-striking fish. It is a further aspect of the invention that the inventive skirt clamp 40 secures the skirt 30 to the lure body 22 from inside the skirt 30 and not the outside and thereby not detracting from the streamlined contours of the transition between lure body 22 and skirt 30.

The advantage of changing one skirt for another allows anglers to test the attractiveness of different skirt colors and styles rapidly, without having to cut the line. As mentioned, FIGS. 8 and 12-13 which show two skirts doubled-up. The advantage of two or more skirts doubled-up or whatever includes some of the same advantages. That is, it allows anglers to test different combinations of skirt colors or skirt styles in order to find what is attractive to fish. It being true for skirt colors too, skirt styles are available in almost endless variety. Whereas a skirt with straight tentacles is shown as a non-limiting example, another example could include and without limitation wavy tentacles, if not something other than tentacles altogether.

Another reason to change skirts or double-up skirts is to alter the swimming action of the lure 20. That is, two skirts doubled-up are heavier than one skirt alone, but also two skirts together tend to increase the drag of the lure in the water. By way of background, skirts are available in a wide array of materials including without limitation vinyl, rubber (synthetic or natural), feather and so on.

The skirt clamp 40 comprises the form of a pan-headed fastener and has a shank 42 formed with external thread and a pan head 44 formed with an external bevel 46. The axially-elongated body 22 has an interior ring portion 52 formed with corresponding internal thread, and the body 22's trailing end 28 is formed with a corresponding interior bevel 54 so that the skirt clamp 40 secures and clamps the waist 32 of the skirt 30 from the inside as shown.

As a matter of more background, many off-the-shelf skirts (not shown) lack the waist 32 as shown by have spherical cap ends (again, this is not shown). It is a preference of the invention that anglers simply snip or lop such spherical cap ends off in order to modify such off-the-shelf skirts to exhibit a waist 32 as shown in the drawings.

Figure 4:
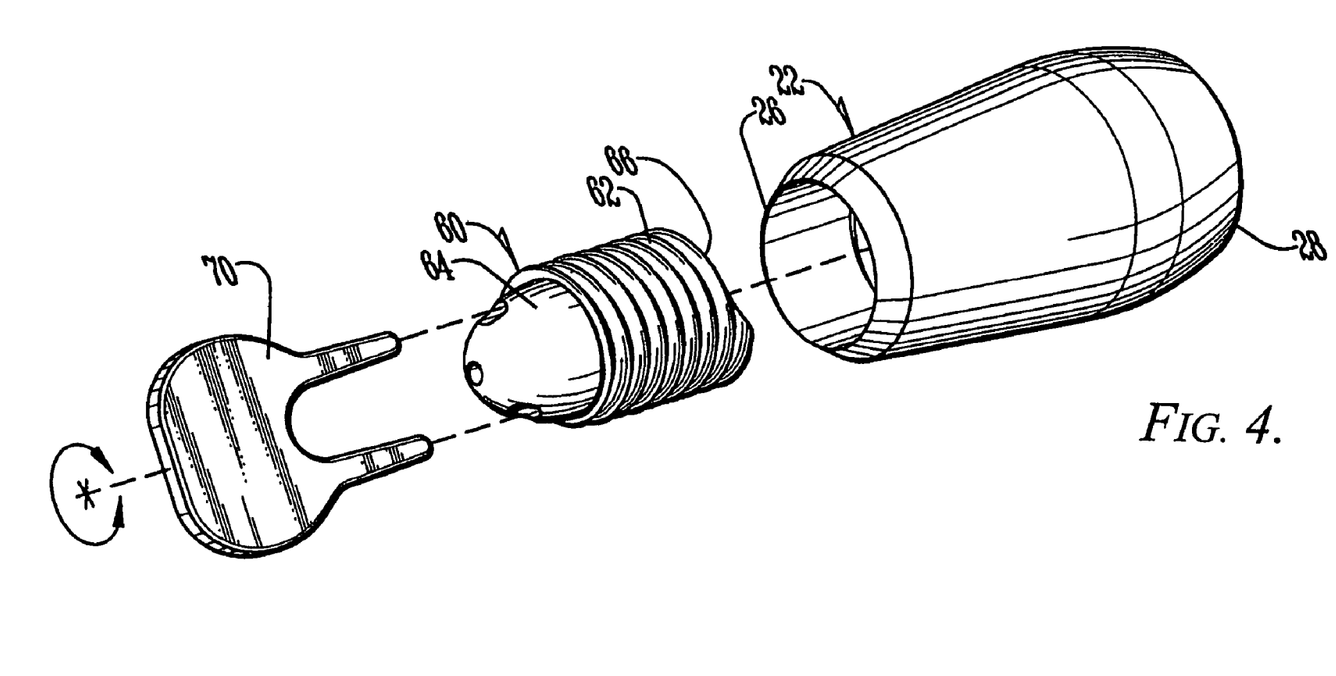
FIG. 4 is an exploded perspective view comparable to FIG. 2 except including illustration of a driving tool used for driving the cap relatively in (to) or out (of) the axially-elongated body, and showing the cap fully withdrawn out of the axially-elongated body.
Figures 5, 6:
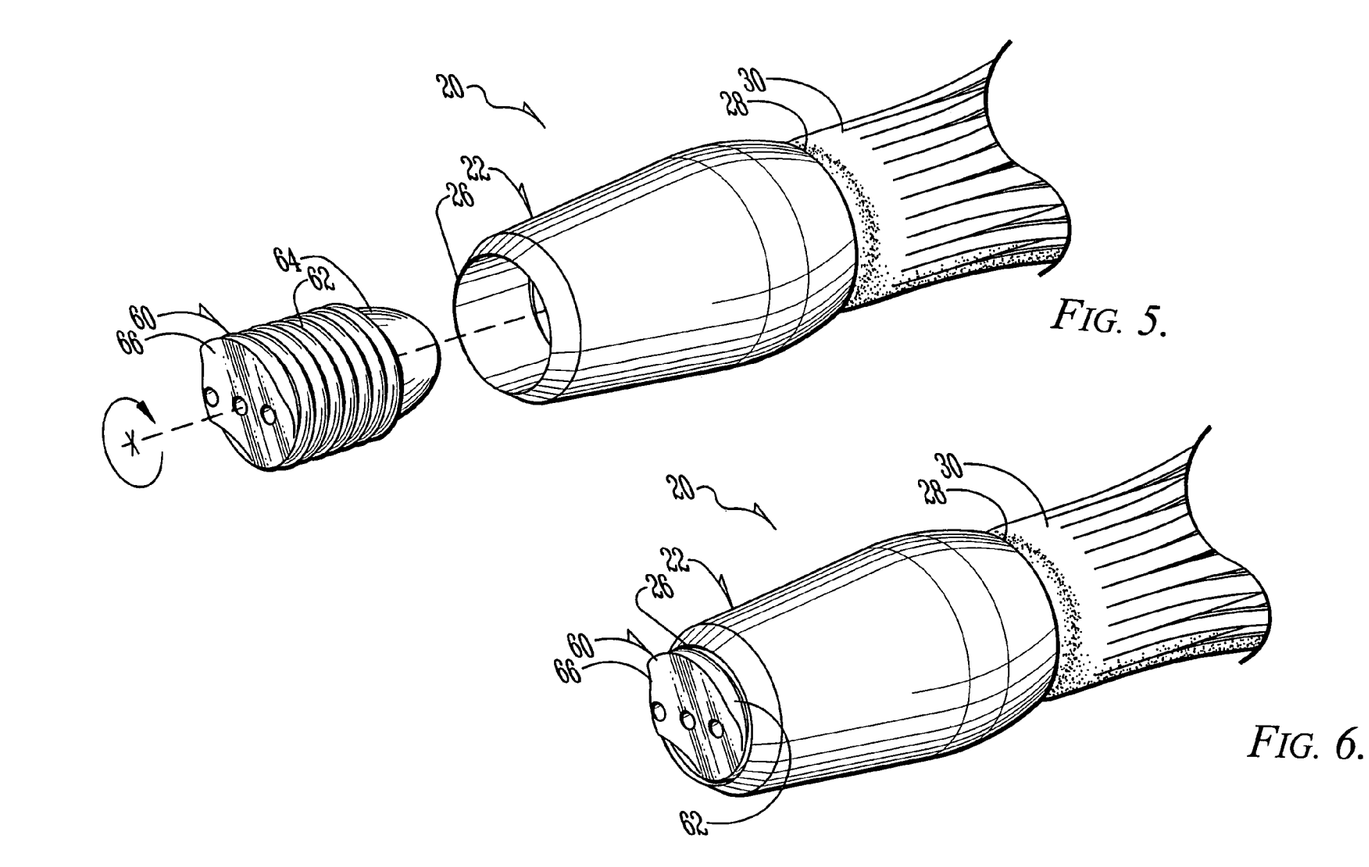
FIG. 5 is an exploded perspective view comparable to FIG. 4 except showing the cap reversed.
FIG. 6 is an exploded perspective view comparable to FIG. 5 except showing the reversed cap driven back into the axially-elongated body.

This version of the cap 60 as illustrated by FIGS. 1 through 6 has a cylindrical sidewall 62 formed with external thread that extends between a torpedo (domed) nose 64 and a plow (flattened and slanted) nose 66 (ie., the plow nose 66 is better shown by FIGS. 5 and 6, and is hidden from view altogether in FIG. 1). The axially-elongated body 22 has a cylindrical fore chamber 58 formed with corresponding internal thread for screw insertion of the cap 60. FIGS. 3 through 6 comprise a series of views to show that this version of the cap 60 is reversible between its torpedo nose 64 and its plow nose 66 for transforming the lure 20 for different effects. In FIG. 3 or 6, the torpedo nose 64 is shown positioned to form the tip end of the lure 20. The cap 60 is twisted into the axially-elongated body 22 as far as shown in order to get the following desired alignment: —that is, so that the torpedo nose 64 forms a fairly smooth transition with the axially-elongated body 22's leading cup rim end 26, which terminates in a relatively sharp taper as shown.

FIG. 4 shows a driving tool 70 in accordance with the invention. The driving tool 70 is provided for engaging and driving the cap 60 either deeper in to or withdrawal out of the axially-elongated body 22. The driving tool 70 is also utilized for tightening and untwisting the skirt clamp 40 as well. The driving tool 70 has spaced prongs for engaging spaced recesses in the cap 60's torpedo nose 64 as shown. Also, as FIGS. 5 and 6 show, the cap 60's plow nose 66 has comparable recesses, as does the pan head 44 of the skirt clamp 40 (eg., these recesses are shown in hidden lines in FIG. 8). The prongs and recesses are cooperatively formed to prevent rotational slipping between the tool 70 and cap 60 (or skirt clamp 40) during twisting/untwisting use. Also, the driving tool 70's prongs are preferably formed from sheetform material for the following purpose. That is, the fishing line 34 can lay along one side or another of the prongs without being nicked, damaged or otherwise compromised.

It is an aspect of the invention that the driving tool 70 can be utilized to drive the skirt clamp 40 or cap 60 without having to cut the line. Hence both the cap 60 and skirt clamp 40 can be completely separated from the body 22 of the lure 20 without having to cut the line in either instance.

Given the driving tool 70, an angler can easily switch the cap 60 around as follows, and as depicted in FIGS. 4 through 6. To begin with, the angler withdraws the cap 60 fully from the body 22 as shown in FIG. 4. Next the angler reverses the cap 60 so that the plow nose 66 faces forward and as shown in FIG. 5. Then FIG. 6 shows the cap 60 driven into the body 22 of the lure 20 so that this arrangement of the plow nose 66 being forward has transformed the lure 20's swimming action.

FIGS. 3a and 3b show one way of varying the lure 20's swimming action. With the torpedo nose 64 positioned as shown in FIG. 3a, the lure 20's swimming action is preferably that of a torpedo-nosed type top-water lure. However, if the cap 60 is driven deeper into the body (as shown in FIG. 3b), the tip end of the torpedo nose 64 can be virtually retracted flush with or perhaps rearwardly behind the front plane of leading cup rim end 26. Hence this has the effect of transforming the lure 20's mode of operation into that of a popping- or chugging type top-water lure.

Accordingly, the inventive lure 20 of FIGS. 1 through 6 can be variously adjusted into several distinctive transformations, each which is distinguished by its own characteristic swimming action between four (4) extremes.

Pause will be taken to consider at least three swimming actions represented by the four (4) extremes (other swimming action are to be described more particularly further below).

First is the swimming action of the conventional torpedo-nosed topwater. This configuration for lure 20 is shown by FIG. 3a. Saltwater anglers prefer to troll these off an outrigger to surf the front side of a wake. At trolling speeds, torpedo-nosed topwater lures tend to skip on the surface. There are various factors which can vary skipping action, such as the pulse rate between skips, or the ratio for each pulse between how long (much time) the lure skims and how long (much time) the lure hops. Such factors include without limitation the weight and drag of the lure.

Next is the swimming action of concave-nosed topwater. This configuration for lure 20 is certainly shown by FIG. 3b. However, if in FIG. 6, if the cap 60 were driven deeper into the body 22 such that the plow nose 66 of the cap 60 were retracted flush with or perhaps rearwardly behind the front plane of leading cup rim end 26, then, this too would be the configuration of a concave-nosed topwater.

Concave-nosed topwater lures tend to swim when trolled at speed with a porpoising action (ie., as in the graceful arcs swum by porpoises breaking the surface).

As an aside, freshwater anglers prefer not to troll but cast concave-nosed freshwater counterparts. Freshwater anglers general retrieve them with a tug-and-pause manner for a popping action. However, if retrieved with a continuous speed, freshwater anglers refer to the action as a 'chugging' action.

Referring again to the saltwater-trolled porpoising action, the lure 20 dives, then swims up, and breaks the surface.

Except, when the lure breaks the surface, it does so with a pop or splash (which is unlike porpoises). Then the lure arcs gracefully in the air for a low arc, and then dives again . . . and so on, doing this repetitiously. It is preferred without limitation to troll concave-nosed topwater lures behind the boat in the turbulence of the wake. Concave-nosed topwater lures tend to dive a shallow arc and then surface with a pop. How long they dive is sometimes a function of how much line is out. For trolling at longer lines, the dive tends to be longer between surfacing.

Again, it possible to configure the lure 20 for a concave-nosed configuration with either the torpedo nose 64 facing forward (and as shown in FIG. 3b) or else with the plow nose 66 facing forward (not truly shown in FIG. 6, because the user would have to twist the cap 60 a lot further into the body 22, but it is doable).

Then there is the swimming action of the slanted-nose topwater. This configuration for lure 20 is shown by FIG. 6 as drawn. A slanted-nose topwater also tends to swim with a porpoising (chugging) action as before, but instead of porpoising on a straight path, it tends to dive and cut a helical path under the water. That is, it surfaces, leaps, then dives, and while diving it tends to cut a helical coil through the water until it surfaces again. Also, the surfacing is not characterized by the same amount of popping or splashing. Nevertheless, preferably but not exclusively, slanted-nose topwater lures are likewise trolled behind the boat in the turbulence of the wake.

Therefore, the lure 20 in accordance with the invention is variably changeable to provide at least the three foregoing swimming actions. That is, the lure 20 can be arranged to swim the skipping action of a torpedo-nosed topwater, the porpoising action of a concave-nosed topwater, or the helically-coiling porpoising action of a slant-faced topwater.

It is an aspect of the invention that the lure 20's swimming action can be changed from a torpedo-nosed topwater (eg., FIG. 3a) to a concave-nosed topwater (eg., FIG. 3b) without having to cut the line.

It is an additional aspect of the invention that the lure 20's swimming action can be changed from a slant-faced topwater (eg., FIG. 6) to a concave-nosed topwater without having to cut the line (ie., the cap 60 twisted into the body 22 such that the plow nose 66 is rearwardly behind the front plane of leading cup rim end 26).

In either FIG. 3a or 6, the way to change the lure 20 into a concave-nosed topwater is achieved by simply twisting the front cap 60 deeper into the lure body 22 until the cup-rim end 26 is the foremost part of the lure 20 facing forwards. That is, with the front cap 60 twisted deep inside the body 22, it has little effect on the swimming again. Instead, the cup-rim front end 26 produces the greatest effect. And the cup-rim front end 26 provides a concave face for the lure 20, with the front cap 60 sufficiently twisted rearwards so as not to provide any significant hydrodynamic effect on the lure 20's swimming action (FIG. 3b is an example of this configuration).

Moreover, the front cap 60 is retractable inside the fore chamber 58 of the body 22 to change the swimming action along a gradation of hybrid swimming actions. The gradation of hybrid swimming actions fall between the extremes of either skipping (FIG. 3a) and porpoising (FIG. 3b) or else between helically-coiling porpoising (FIG. 6) and straight porpoising (not truly shown but the illustration of this extreme would be like FIG. 6 but only if the cap 60 were twisted in a lot further).

Figure 7:
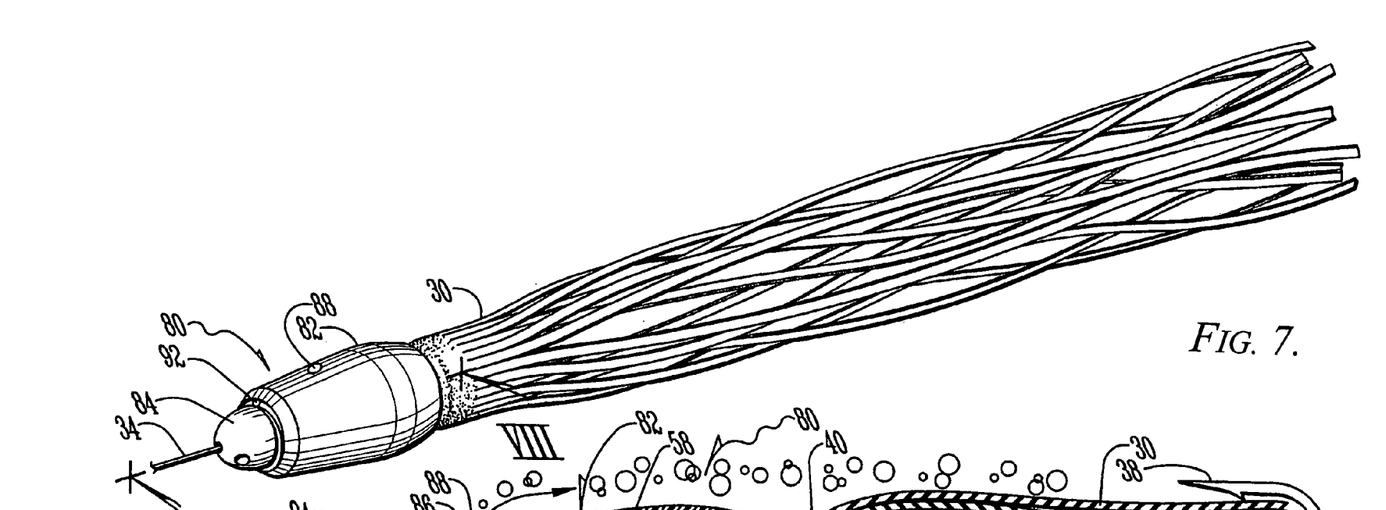
FIG. 7 is a perspective view comparable to FIG. 1 except showing the axially-elongated body being formed with a side vent.
Figure 8:
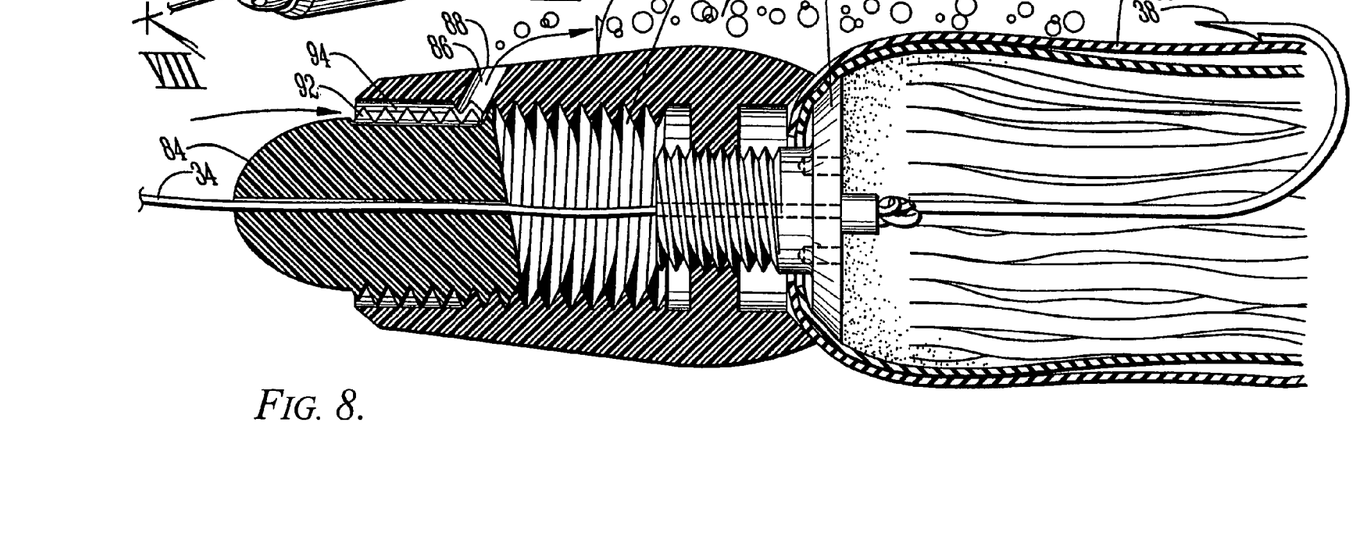
FIG. 8 is an enlarged-scale partial sectional view taken along line in FIG. 7 and showing the production of a bubbling/jetting effect in accordance with the invention.

FIGS. 7 and 8 show an alternate embodiment of the lure 80 in accordance with the invention for producing an adjustable bubbling/jetting effect in accordance with the invention. The axially-elongated body 82 is formed with a tail run 86 of a ventilation passage through its sidewall that extends from the fore chamber 58 to a termination in the skin of the sidewall as a side vent 88. FIG. 8 shows that a main and axial run 94 of the ventilation passage originates in an intake opening 92 on the mating line between the cap 84 and axially-elongated body 82. The main axial run 94 extends through the respective thread formations of the cap and body 84 and 82 until the main run 94 intersects the tail run 86 that leads out to the side vent 88. FIG. 7 shows where the intake opening 92 is located with respective to the overall front geometry of the lure 80. In use, the side vent 88 issues a stream of bubbles and/or water slugs intermittently with jets of water that not only leave a diminutive wake to the side of the main wake of the lure 80 (as the lure 80 courses its way along during a troll or retrieve), but also push the lure laterally in an erratic fashion.

Figure 9:
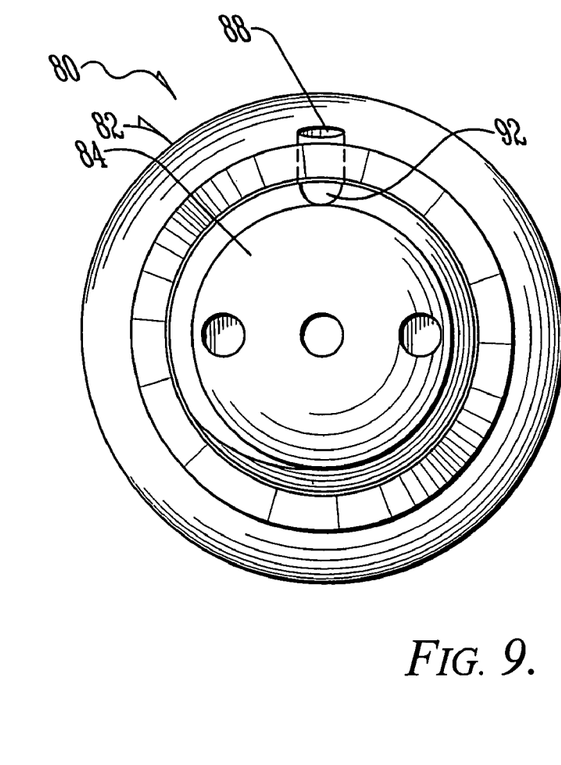
FIG. 9 is an enlarged-scale, front elevational view of either FIG. 7 or 8.
Figure 10:
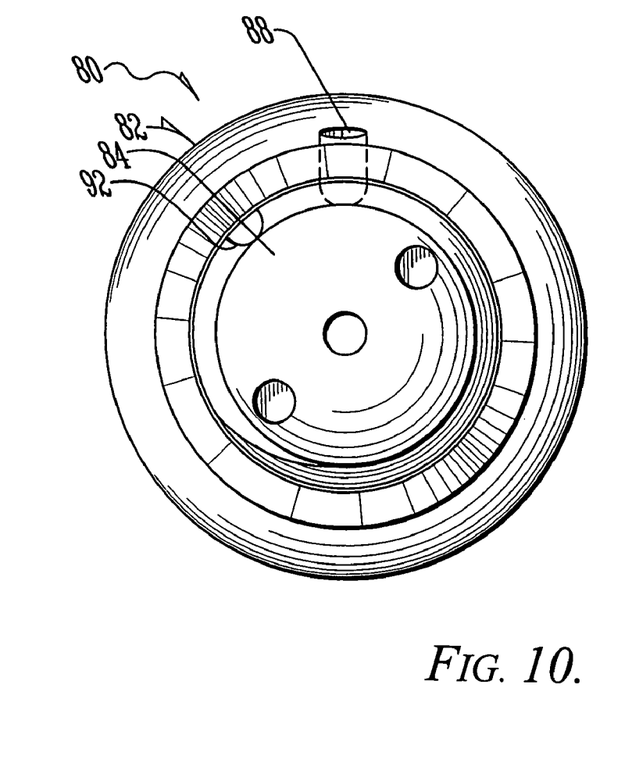
FIG. 10 is a front elevational view comparable to FIG. 9 except showing the cap twisted a fraction of a turn counter-clockwise in order to turn OFF the bubbling/jetting effect.

FIGS. 9 and 10 show that the bubbling/jetting effect can be turned ON or OFF depending on the twist of the cap 84. In FIG. 9, the cap 84 is twisted relative the body 82 to match up the mutual halves of the ventilation passage's main run 94 (ie., as formed in the meshing threads of the cap 84 and body 82 respectively). That way, with the main run 94 being formed as a matched-up passage, the main run 94 is thus "open" for business, and hence the bubbling/jetting effect is turned ON. In contrast, FIG. 10 shows the cap 84 twisted a fraction of a turn counter-clockwise in order to mismatch the mutual halves of the ventilation passage's main run 94 (again, as formed in the meshing threads of the cap and body 84 and 82 respectively). Hence, with the mutual halves of the main run 94 being twisted out of alignment, the bubbling/jetting effect is thus turned OFF.

Needless to say the bubbling/jetting effect changes the swimming action of the lure. One, it produces a different wake for the lure. Two, it changes the straightness of the lure's tracking, and so on.

Hence the FIGS. 8-10 lure has two sets of four swimming action extremes available to it with cutting the line (with all sort of gradation of hybrid swimming actions available too).

One set of four swimming action extremes available to the lure 80 without cutting the line includes:—
- torpedo nose, with side-jetting;
- torpedo nose, without;
- concave nose, with side-jetting; and
- concave nose, without.

Correspondingly, the other set of four swimming action extremes available to the lure 80 without cutting the line includes:—
- plow nose, with side-jetting;
- plow nose, without;
- concave nose, with side-jetting; and
- concave nose, without.

FIG. 11 shown an additional embodiment of the lure 100 in accordance with the invention. This additional embodiment of the lure 100 has a cap 110 that incorporates a source of illumination in order to produce an illuminated effect in accordance with the invention. It is preferred without limitation that the illumination effect be configured to give the lure 100 the resemblance of a creature with glowing or reflective eyes.

One way to achieve the illumination effect includes the incorporation within the cap 110 of one or more LED lamps 112 powered by one or more battery cells 114 connected up by a power circuit. Preferably the cap 110 is produced of transparent plastic. It may be painted with translucent paint to tint it to glow in a selected color. Alternatively, it might be painted with opaque paint generally all over except over the eyes. The turning ON and (perhaps OFF) of the power circuit can be achieved by a circuit-making plate 116 that is driven to make (ie., complete) the circuit by the twisting of the cap 110 deeper into the body 22 as an opposing compression spring 118 pushes the contact-making plate 116 harder against battery cells 114 that travel with the cap 110 as shown.

FIG. 12 shows a further embodiment of the lure 120 in accordance with the invention and as configured for producing a scent-issuing effect in accordance with the invention. The body 122's fore chamber 58 is pre-charged with a scent concentrate 130 as shown. The lure 120's cap 124's central line-passing hole 134 might be oversized by some small measure (or not) in order to facilitate a greater intake current of water into the fore chamber 58. Likewise, the skirt clamp 40's central line-passing hole 136 might also be oversized by some small measure (or not) to increase the wash-out current from the fore chamber 58. By way of being introduced by the line-hole 134 in the cap 124, a water current is admitted in the fore chamber 58 and mixes with and carries out through the skirt clamp 40's line-hole 136 some minute amounts of scent concentrate 130. That way, the lure 120 trails behind itself a scent trail as the lure 120 courses its way along during a troll or retrieve.

It is another aspect of the invention that the recesses in the cap 124 for the prongs of the driving tool 70 might be drilled all the way through cap 124. That way, scenting substance might be squirted inside the fore chamber 58 without the angler having to remove the cap 124.

FIG. 13 shows yet another adaptation of the lure 120 in accordance with the invention to transform it for producing the combined effects in accordance with the invention of both the (unscented) bubbling effect in accordance with (eg.) FIG. 8 and the scent-issuing effect of FIG. 12.

The lure 20 in accordance with the invention affords the opportunity for transformation for further effects as well, including without limitation inclusion of a rattle effect (not shown). That is, the fore chamber 58 allows the keeping of small BB rattles therein (not shown) to produce a rattle effect while the lure courses its way along during a troll or retrieve.

It is an advantage of the lure in accordance with the invention that it can be tuned for a variety of different topwater swimming actions after it has been fully rigged up and without having to cut (either) the main line or (leader line, if any).

Hence a preferred embodiment of invention has the front cap (eg., 60) formed with one end presenting a torpedo nose 64 and the other end presenting a plow nose 66.

Pause can be taken to consider the various ways the lure in accordance with the invention can be tuned for different swimming actions with the torpedo nose 64 leading. The various tunable positions include (and the resultant predominant-type swimming action or other effect caused thereby) the following, without limitation:
- torpedo nose more or less extended, hence more or less a skipping action; or
- torpedo nose more or less retracted, hence more or less a porpoising action; and
- either way, bubbling/jetting action that can be switched on or off; and/or
- either way, variously interchangeable or combinable skirts;

wherein also, the other effects that can be included or excluded without limitation can be:
- inclusion or exclusion of a scent trail;
- inclusion or exclusion of illumination; and/or,
- inclusion or exclusion of a rattling noise.

In comparison, consideration can now be taken to consider the various ways the lure in accordance with the invention can be tuned for different swimming actions with the plow nose 66 leading. The various tunable positions include (and the resultant predominant-type swimming action or other effect caused thereby) the following, without limitation:
- plow more/less extended, hence more/less a helically-coiling porpoising action; or
- plow more/less retracted, hence more/less a linear porpoising action; and either way, bubbling/jetting action that can be switched on or off; and/or either way, variously interchangeable or combinable skirts; wherein also, the other effects that can be included or excluded without limitation can be:

inclusion or exclusion of a scent trail;
inclusion or exclusion of illumination; and/or,
inclusion or exclusion of a rattling noise.

And so on endlessly, persons readily skilled in the art now being taught the concept of designing a lure which is alterable in many ways for different swimming actions and/or other effects which are selectable after the lure has been fully rigged up on the rod-reel-and-line combination: —and being able to do so without having to cut the (main) line (or leader line/s, if any). Whereas the drawings show a front cap (eg., 60) having spaced ends formed as a torpedo nose and plow nose respectively, this has been done so for brevity's sake in the drawing and description since persons ordinarily skilled in the art can readily recognize that all the endless variety of lure noses can be executed in the designs of the spaced ends of the front cap (eg., 60). For example and without limitation, one end of the front cap (eg., 60) might present a scalloped plow nose (not shown). As another example and without limitation, one end of the front cap (eg., 60) might present a concave front nose: —that way, when extended, the swimming action porpoises according to a minor-diameter concave face in contrast to when retracted the swimming action porpoises according to a major diameter swimming action.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. An artificial fishing-lure head (20) having an alterable swimming action which is manually adjustable without having to cut the line or else add or remove parts, comprising:

an axially-elongated body (22) extending axially between a leading rim (26) and a trailing end (28), the body (22) formed through the leading rim (26) with a recessed-in axially-elongated fore chamber (58) that is formed with coupling formations;

an axially-elongated insert therefor not only extending between a non-concave leading end (64) and a trailing end (66) but also being formed with counterpart coupling formations as well as with an axial line-threading through hole (134) so that said insert slides or threads on fishing line (34) in free sliding fashion except, even while the fishing line (34) is allowed to trail out the body (22)'s trailing end (28), the lure head (20) is adapted to be stopped from sliding off rearwardly after trailing tackle (38) is rigged in place;

said insert coupling the fore chamber (58) such that said insert axially travels between extended and retracted extremes in the fore chamber (58);

wherein the retracted extreme comprises the insert's leading end (64) withdrawn rearward of the body (22)'s leading rim (26), and the extended extreme comprises the insert's leading end (64) exposed forward of the body (22)'s leading rim (26);

wherein the retracted extreme has insert's leading end (64) less involved with lure head (20)'s swimming action than the body (22)'s leading rim (26), which consequently dominates and presents a concave face for the lure head (20) and as such the lure head (20) is adapted to produce a porpoising swimming action in a fairly straight line;

wherein the extended extreme, in contrast, has the insert's leading end (64) dominating the influence over the lure head (20)'s swimming action and as such the lure head (20) is adapted to produce a distinct alternate swimming action for the lure head (20);

said insert being operatively adjustable in the fore chamber (58) by the coupling formations and counterparts thereto to hold a fixed position among a range of positions between said extremes in order to change the swimming action of the lure head (20) from not just porpoising in a fairly straight line nor simply else the distinct alternate swimming action for the lure, but also along a gradation of hybrid swimming actions therebetween, and all without having to cut the line (34) after the trailing tackle (38) is rigged in place, or else add or remove parts.

2. The artificial fishing lure head (20) of claim 1 wherein the insert's leading end (64, 66) has a swimming profile and the profile either presents a pointed nose (64) so that in the extended extreme the lure head (20)'s swimming action behaves toward more of a skipping swimming action, or else, presents a plow nose (66) so that in the extended extreme the lure head (20)'s swimming action behaves toward more of a helically-coiling porpoising swimming action.

3. The artificial fishing lure head (20) of claim 1 wherein the coupling and counterpart coupling formations comprise internal and external threads.

4. The artificial fishing lure head (80) of claim 1 wherein the insert is formed with a ventilation passage originating in an intake opening (92) in the leading end (26) and in communication with a port formation (94) in the sidewall thereof, and the sleeve (82) is formed with a ventilation passage which originates in cooperative port formation (86) in the fore chamber (58) and terminates in a vent (88) in the sleeve (82) for issuing a bubbling/jetting stream off the sleeve (82) intermediate the leading and trailing rims (26 and 28) thereof, said insert being operatively selectable between, one, the port and cooperative port formations (94 and 86) being matched up such that lure (80)'s swimming action is altered by the bubbling/jetting effect issuing from the vent (88) and, alternately, being not matched up so that there is no bubbling/jetting effect with the vent (88).

5. The artificial fishing lure head (80) of claim 4 wherein the coupling and counterpart coupling formations comprise internal and external threads such matching up or not matching up the port and cooperative port formations (94 and 86) comprises twisting the insert and sleeve (82) relative each other.

6. An artificial fishing-lure head (20) having an alterable swimming action which is manually adjustable without having to cut the line or else add or remove parts, comprising:

an axially-elongated body (22) extending axially between a leading rim (26) and trailing end (28), the body (22) formed through the leading rim (26) with a recessed-in axially-elongated fore chamber (58) that is formed with coupling formations;

an axially-elongated insert therefor extending between a first non-concave end (64) having a swimming profile that produces a first swimming action that is distinctly different from a concave-faced lure head's porpoising swimming action in a fairly straight line, and, a second non-concave end (66) having a swimming profile that produces a second swimming action that is distinctly different from not only a porpoising swimming action in a fairly straight line but also the swimming action of the first end (64);

said insert being formed with counterpart coupling formations as well as with an axial line-threading through hole (134) so that said insert slides or threads on fishing line (34) in free sliding fashion except, even while the fishing line (34) is allowed to trail out behind the body (22), the lure head (20) is adapted to be stopped from sliding off rearwardly after trailing tackle (38) is rigged in place;

said insert coupling the fore chamber (58) such that said insert axially travels when manually adjusted between an extended extreme and a retracted extreme;

said insert, prior to the trailing tackle (38) being rigged in place, inserts reversibly into the recessed-in fore chamber (58) and so affords selecting between the first end (64) or the second end (66) as the presently-selected leading end (64 or 66);

wherein said insert moreover coupling with the fore chamber (58) such that, after the trailing tackle (38) is rigged in place, said insert is capable of manually adjusted axial travel without having to cut the line (34);

whereby the lure has at least three swimming actions comprising the first non-concave end (64) adjusted to the extended extreme therefor, the second non-concave end adjusted to the extended extreme therefor, either of the first or second non-concave end (either 64 or 66) adjusted to the retracted extreme, and whereby manual adjustment of either of the non-concave ends (64 or 66) between the respective extended and retracted extremes therefor is possible without having to cut the fishing line (34) after the trailing tackle (38) is rigged in place or else add or remove parts.

7. The artificial fishing lure head (20) of claim 6 wherein the swimming profile of the first non-concave end (64) is domed as adapted to provide a skipping swimming action and the swimming profile of the second non-concave end (66) is flat and slanted as adapted to provide a helically-coiling porpoising swimming action.

* * * * *